(12) United States Patent
Altevogt et al.

(10) Patent No.: US 8,234,270 B2
(45) Date of Patent: *Jul. 31, 2012

(54) SYSTEM FOR ENHANCING DECODING PERFORMANCE OF TEXT INDEXES

(75) Inventors: Peter Altevogt, Ettlingen (DE); Silvio Weidrich, Striegistal (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/775,546

(22) Filed: May 7, 2010

(65) Prior Publication Data

US 2010/0217761 A1    Aug. 26, 2010

Related U.S. Application Data

(63) Continuation of application No. 11/112,612, filed on Apr. 21, 2005, now Pat. No. 7,756,863.

(30) Foreign Application Priority Data

Apr. 22, 2004   (DE) .................................. 041 01 679

(51) Int. Cl.
   *G06F 7/00* (2006.01)
   *G06F 17/30* (2006.01)

(52) U.S. Cl. ...................................................... 707/722

(58) Field of Classification Search .................. 707/722, 707/999.102
See application file for complete search history.

(56) References Cited

U.S. PATENT DOCUMENTS

| | | | |
|---|---|---|---|
| 5,351,047 A | | 9/1994 | Behlen |
| 5,426,736 A | * | 6/1995 | Guineau, III .................. 710/56 |
| 5,623,262 A | * | 4/1997 | Normile et al. ................. 341/67 |
| 5,724,033 A | * | 3/1998 | Burrows ........................ 341/76 |
| 6,005,503 A | * | 12/1999 | Burrows ........................ 341/67 |

* cited by examiner

*Primary Examiner* — Aleksandr Kerzhner
(74) *Attorney, Agent, or Firm* — Sawyer Law Group, P.C.

(57) ABSTRACT

The present invention is a system for enhancing the decoding performance of text indexes of an indexed collection of text documents. The posting list includes a plurality of list entries being of variable size depending on the value stored in each posting list entry. The inventive system is based on a statistical analysis of the posting list entries of the plurality of list entries. Prior to decoding, the system can select a decoding routine being appropriate to decode the most frequent type of posting list entries or of a plurality of various posting list entries. After selecting a particular decoding routine and executing the decoding routine for decoding of the entire posting list, a failure check is performed. In the exceptional case that a failure has occurred, a second alternative decoding routine is selected and executed.

7 Claims, 7 Drawing Sheets

SYSTEM FOR ENHANCING DECODING PERFORMANCE OF TEXT INDEXES

PRIORITY CLAIM

The present application claims the priority of application Ser. No. 11/112,612 filed on Apr. 21, 2005, entitled "Method of Enhancing Decoding Performance of Text Indexes, which claims the priority of German patent application titled "Method of Enhancing Decoding Performance of Text Indexes," Serial No. 04101679.1, filed on Apr. 22, 2004, whose entire disclosures are incorporated by reference herein.

FIELD OF THE INVENTION

The present invention relates to the field of decoding encoded and compressed posting lists of text indexes used by search engines, for retrieving documents in an indexed collection of electronic text documents.

BACKGROUND OF THE INVENTION

Search engines provide important tools for retrieving information from digitalized text documents. They may be used in stand alone mode or as components of more complex information retrieval software solutions, e.g., of text mining or internet portal software. Because of the strong growth of the amount of digitalized text data to be searched, excellent performance and scalability features are essential for search engines, especially during query operations.

The fundamental data structure of search engines is based on indexed collections of text documents. Before applying search queries on a text database or a collection of text documents, an indexing process is performed. During such an indexing process each text document of the database of text documents is analyzed in order to identify search terms. As a result one obtains an assignment between a text document and distinct search terms that are contained in the document. This assignment is preferably inverted in form of a posting list for each search term. Typically, a posting list for a given search term contains a list of document identifiers corresponding to the documents containing this particular search term.

Figure 1:
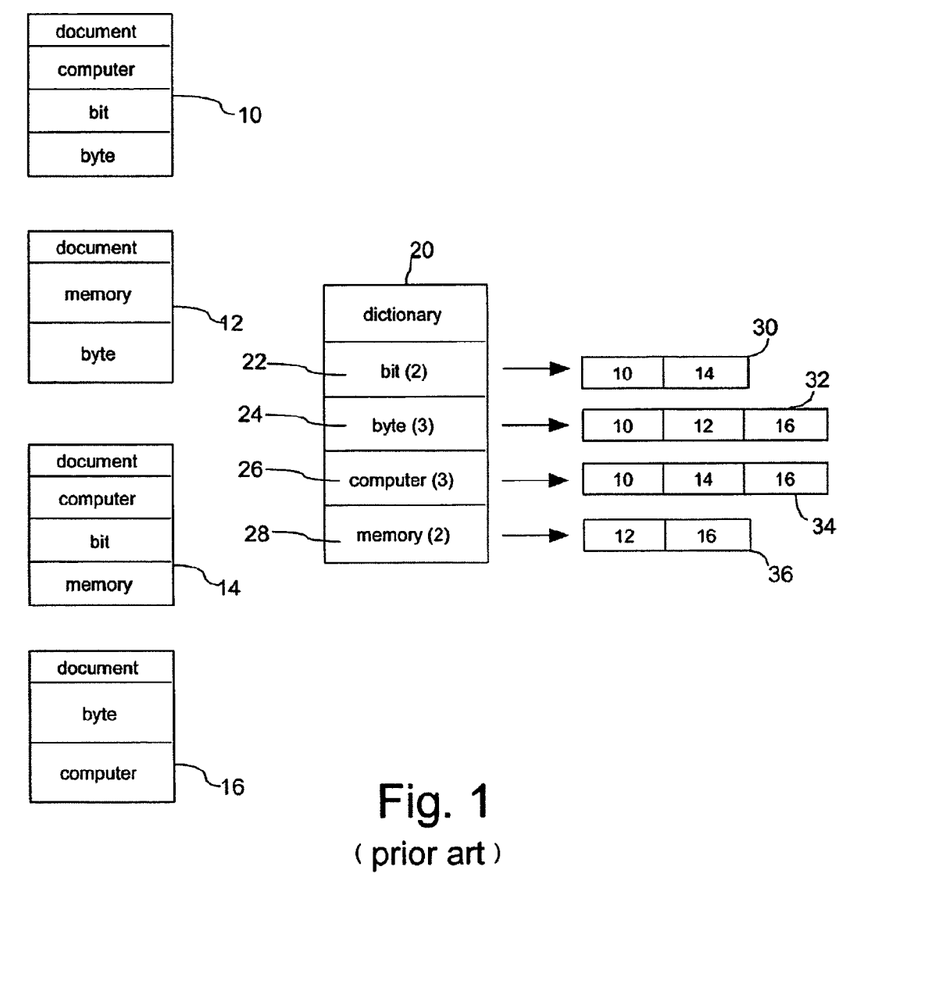
FIG. 1 illustrates a conventional block diagram of a list of text documents and corresponding dictionary and posting lists.

FIG. 1, shows a block diagram of a list of conventional text documents, a dictionary, and a corresponding set of posting lists.

Each text document 10, 12, 14, 16 comprises a list of words. For example, document 10 has the words: "computer", "bit" and "byte". Document 12 has the words: "memory" and "byte", etc.

The dictionary 20 has an entry 22, 24, 26, 28 for each single word appearing in one of the documents 10, 12, 14, 16. For example the word "bit" is in document 10 and in document 14. Hence, it appears twice in the list of documents 10, 12, 14, 16.

The entry 22 of the dictionary 20 indicates that the word "bit" appears twice in the list of documents 10, 12, 14, 16. Similarly, the word "computer" appears three times as indicated by the entry 26 of the dictionary 20.

The posting lists 30, 32, 34, 36 represent an inverted dictionary for each single word that appears in the list of documents. For example, posting list 32 indicates that the word "bit" appears in document 10 and in document 14, as indicated by the corresponding document identifiers that are stored as list entries in the posting list.

The posting list 36 indicates that the word "computer" appears in the documents 10, 14, and 16 and therefore points to these documents. Performing a search query is typically based on such posting lists thus enabling an efficient and fast processing of a search queries.

In general, the posting lists are compressed to save disc space and to reduce input and output (IO) traffic. The structure of these compressed posting lists, and the performance of an associated decoding or decompressing algorithm, are critical for the query response times.

The posting lists of search engines contain at least the document identifier and possibly even the position of a search term within the document. Additionally, other data associated with search terms may be stored in the dictionary.

An approach for compressing a posting list is for example given by the delta encoding procedure. When some search term appears in six documents of the indexed collection of text documents and these documents are for example numbered 4, 6, 9, 12, 48, 70, the corresponding search term can then be described in the simplest case by an inverted file, associated with the following posting list: (4, 6, 9, 12, 48, 70). Because such a list is in ascending order, the list can be stored as the initial position followed by a list of the differences between the current and a successive element of the list. Applying such a delta encoding procedure for the above mentioned list would result in: (4, 2, 3, 3, 36, 22).

The advantage of such a representation is that on average substantially fewer bits per list element are necessary to encode it. Especially, when the numbers of a posting list corresponding to the document identifiers become rather large, these numbers may require 16 or even more bits of disc space in order to be stored in an un-encoded way. Therefore, when a posting list contains numerous document identifiers, storing the difference between successive document identifiers of the posting list appreciably reduces the required disc space.

Upon application of a delta decoding procedure, it is also possible to selectively decode only designated list entries or parts of the list rather than applying the decoding procedure to the entire list. Usually, delta decoding as well as delta encoding techniques are supplemented by methods to provide effective means for selectively decoding and encoding particular list entries.

In order to exploit the advantages of a delta encoding procedure, it is reasonable to store the list entries of an encoded posting list in buckets of variable size depending on the number of bits to be encoded. Regarding the above mentioned list, each of the first four list entries could be stored by a 2 bit bucket and the last two entries could be stored by a 5 bit bucket. Since the compressed delta encoded posting list has to be decoded, it is of advantage to limit the number of different buckets because the decoding of list entries of different buckets usually requires a particular decoding routine. It is therefore of practical use to store the list entries of a posting list in buckets with e.g., 4 bits, 8 bits, 16 bits, etc.

This allows the storage of list entries of various sizes by means of a discrete number of buckets. For example, making use of an ensemble of three buckets with 4 bit, 8 bit and 16 bit, the 4 bit bucket is used for storage of list entries having a size smaller than or equal to 4 bits. The 8 bit bucket is used for storage of list entries requiring between 5 and 8 bits of storage size and the 16 bit bucket is appropriate to store entries having a size between 9 and 16 bits.

Making use of encoded posting lists featuring several buckets for the posting list entries on the one hand reduces the overall size of the posting list but on the other hand it requires an increase of operations in order to decode the list entries of a posting list.

In the simple case of sequentially decoding a complete posting list the decoding algorithm for a single list entry may look as follows:

get size of current index entry,
        if the size of the current index entry is smaller than 4 bit, then decode current position by a 4 bit decoding routine,
        else, if the size of the current position is smaller than 256, then decode the current list entry with a 8 bit decoding procedure,
        else, if the current list entry is smaller than 65536, then decode the current list entry with a 16 bit decoding procedure.

This example illustrates, that a multiplicity of "else if" statements has to be performed in order to decode a single list entry appropriately.

Because the decoding process described above has to be performed on at least parts of an entire posting list that may contain millions of entries, the process of query execution becomes extremely time critical and every instruction saved in the decoding procedure will result in a significant decrease of the query response times.

The present invention therefore aims to provide a method of enhancing decoding performance of text indexes.

SUMMARY OF THE INVENTION

The present invention provides a method of decoding at least one posting list of an indexed collection of text documents. The at least one posting list has a plurality of encoded list entries of variable size and each list entry is indicative of an identifier of a text document. The method of decoding the posting list performs the step of executing a first decoding procedure for decoding each encoded list entry of the at least one posting list, wherein the first decoding procedure is specific of a first size of the encoded list entries. As a second step, a second decoding procedure for decoding each encoded list entry of the at least one posting list is executed, if the first decoding procedure fails to decode the list entries of the at least one posting list.

The first decoding procedure is a rather speculative decoding technique because irrespectively of the actual bucket associated with each list entry, the first decoding procedure assumes a first bucket for each of the encoded list entries of the at least one posting list. By assuming a specific bucket, the performance of the decoding procedure appreciably enhances when the assumed first bucket of the encoded list entries equals the real bucket of the encoded list entries of the at least one posting list. Only in the exceptional case when the assumed first bucket of the encoded list entries does not correspond to the real bucket of a list entry the second decoding procedure has to be applied. This second decoding procedure inherently makes use of a plurality of decoding steps, i.e., performing numerous steps to identify the bit size of each list entry and successively decoding the list entries with a corresponding decoding routine.

According to a further preferred embodiment of the invention, the first size of the encoded list entries is indicative of the most frequent size of all list entries of each one of the at least one posting list. In this way statistical information of the size of each list entry is exploited in order to guarantee that the first decoding procedure based on the most frequent size of the encoded list entries is applicable. In typical cases of indexed collections of text documents, the frequency distribution of the length of posting list entries is non-uniform and provides a peak for a certain bucket. Selecting the peak bucket, i.e., selecting the bucket that contains the most entries of a given posting list, for specifying a decoding procedure therefore represents an appropriate choice for most of the list entries that have to be decoded. In this context, the expression "most frequent size" refers to the peak bucket of a posting list.

Since the first decoding procedure makes effective use of the peak bucket, operations required to identify the size of the list entries as performed in the prior art, can be skipped. In this way, the number of operations that have to be performed in order to decode a posting list is remarkably reduced leading to an appreciable enhancement of the decoding performance.

Only in case, when the first decoding procedure fails to decode the at least one posting list, an additional second decoding procedure has to be applied. In such a case the decoding performance obviously decreases. Taking into account an extreme non-uniform frequency distribution of the lengths of the posting list entries such a failure only occurs for a few exceptional cases and even though the decoding slows down for such exceptional cases, the overall decoding performance enhances.

According to a further embodiment of the invention, the first size of the encoded list entries is indicative of the most frequent size of at least a sub-set of the posting lists. In this way the first size of the encoded list entries represents peak bucket of all list entries of a plurality of posting lists. Preferably, an appropriate size indicator or peak bucket indicator is stored in the dictionary.

This is particularly advantageous when a combined search query has to be performed that makes use of various posting lists featuring different peak buckets. Preferably, the determination of a peak bucket, hence the statistical analysis of each posting list is performed during generation of the posting list, i.e., during the indexing process. In this way, the statistical analysis does not have to be performed during a time critical search query.

According to a further embodiment of the invention, each list entry comprises a value and a size indicator. The size indicator specifies the size of the list entry, i.e., the corresponding bucket type. The size, hence the bucket type of each list entry in turn depends on the value of the list entry. For example, any number in the range between 1 and 16, can be stored as a 4 bit number. Here, the value of the list entry corresponds to the number and the size indicator specifies that the number is a 4 bit number. The size indicator therefore specifies that a 4 bit decoding routine has to be applied in order to decode the particular list entry.

According to a further embodiment of the invention, the detection of a failure of the first decoding procedure makes use of the size indicator of each of the list entries of the at least one posting list. Preferably after applying the first decoding procedure the size indicator of each list entry is analyzed in order to detect a potential failure of the first decoding procedure.

According to a further embodiment of the invention, the first decoding procedure is selected from a plurality of decoding procedures. Each decoding procedure of the plurality of decoding procedures is specific for a size of the list entries of the at least one posting list. Since different posting lists typically provide different frequency distributions for the lengths of their list entries, the first decoding procedure can be appropriately selected in order to prevent failure. In this way a plurality of different peak buckets for various encoded posting lists can be determined and an appropriate first decoding procedure can be individually applied for each posting list.

According to a further embodiment of the invention, the peak bucket of the encoded list entries is stored as a size indicator of the at least one posting list in form of an entry in the associated dictionary. This means for example, that the peak bucket representing the most frequent size of all list entries of a posting list is determined and stored as meta-information in the dictionary. In this way, information of the peak bucket of the list entries of a posting list is already provided by the dictionary and does not have to be determined by the decoding procedure. Preferably, this first size, i.e., the most frequent size of the encoded list entries is already determined during the indexing procedure, i.e., when the posting list is generated. Alternatively, the peak bucket of encoded list entries of a single posting list can also be stored as a size indicator in each posting list itself.

According to a further embodiment of the invention, the at least one posting list is dynamically modifiable in response of text documents being added or removed from the indexed collection of text documents. This feature requires the decoding method to dynamically adapt to a modified set of indexed text documents. Since an indexed collection of text documents, such as e.g., an intranet of a company, is not static, changes to the posting list apply to various list entries pointing to documents that are subject to removal or any other kind of modification.

This means that even major parts of a posting list may change with all its consequences for the inventive decoding procedure. In particular, when the most frequent size of the list entries of a posting list, i.e., the peak bucket changes, a different type of decoding procedure is autonomously selected as the first decoding procedure. In this way, the inventive decoding accounts for dynamic changes of the underlying collection of text documents. Especially this dynamic feature provides a kind of autonomic computing behavior of the inventive decoding mechanism.

In another aspect, the invention provides a data processing system for decoding at least one posting list of an indexed collection of text documents. The at least one posting list has a plurality of encoded list entries of variable size and each list entry being indicative of an identifier of a text document. The data processing system comprising means for executing a first decoding procedure for decoding each encoded list entry of the at least one posting list. This first decoding procedure is specific of a first size of the encoded list entries. The data processing system further comprising means for executing a second decoding procedure for decoding each encoded list entry of the at least one posting list if the first decoding procedure fails to decode the list entries of the at least one posting list.

In still another aspect, the present invention provides a computer program product for decoding at least one posting list of an indexed collection of text documents. The at least one posting list has a plurality of encoded list entries of variable size and each list entry being indicative of an identifier of a text document. The computer program product comprising program means being adapted to execute a first decoding procedure for decoding each encoded list entry of the at least one posting list. This first decoding procedure is specific of a first size of the encoded list entries. The computer program product further comprising program means being adapted to execute a second decoding procedure for decoding each encoded list entry of the at least one posting list if the first decoding procedure fails to decode the list entries of the at least one posting list.

BRIEF DESCRIPTION OF THE DRAWINGS

In the following, preferred embodiments of the invention will be described in greater detail by making reference to the drawings in which.

DETAILED DESCRIPTION OF PREFERRED EMBODIMENTS

Figure 2:
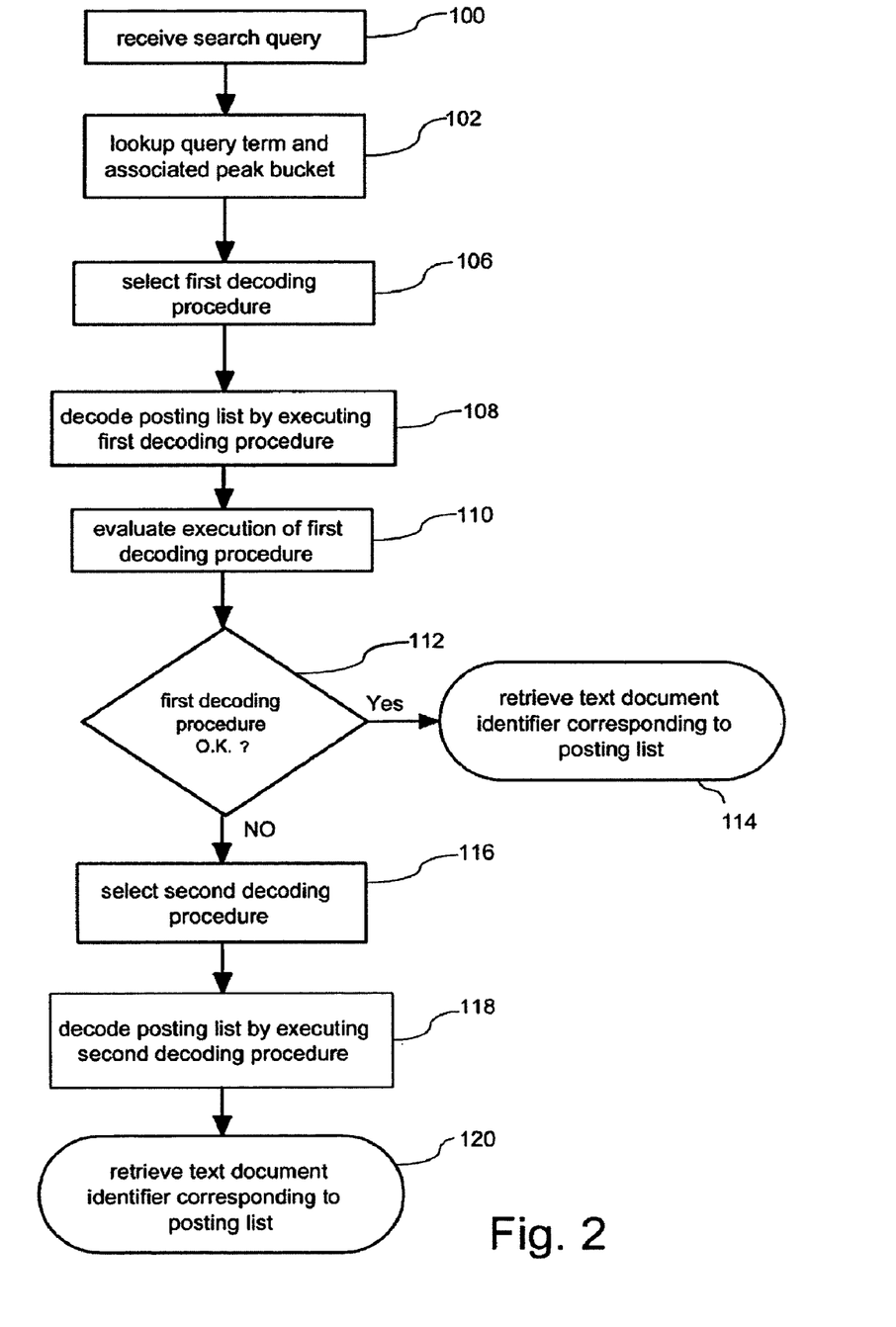
FIG. 2 illustrates a flowchart for performing the inventive decoding procedure.

FIG. 2 illustrates a flowchart of method of decoding a posting list according to the present invention. In response of receiving a search query in step 100, in the following step 102 a query term is looked up in the dictionary and an associated peak bucket is retrieved. Preferably, the peak bucket is looked up in the dictionary but it may also be stored in a posting list that corresponds to particular search term. Since the retrieved posting list is encoded, it has to be decoded. The single list entries of the encoded posting list represent different values and therefore feature a varying bucket size on the storage medium. A most frequent size, i.e., a peak bucket, of posting list entries is determined upon generation of the posting list and is stored as meta-information in form of a separate entry of the dictionary.

Depending on the determined peak bucket of the posting list entries, in step 106 a corresponding first decoding procedure is selected. This first decoding procedure makes use of a decoding routine being applicable for decoding those list entries having the most frequent, thus the first size. Preferably, the posting list entries are stored by a limited number of different storage buckets, e.g., buckets of 4 bits, 8 bits, 16 bits. When for example, the peak bucket of a posting list is 4 bit, in step 106 a corresponding decoding procedure making use of a 4 bit decoding routine is selected. In the subsequent step 108 the posting list is decoded by executing the selected decoding procedure, i.e., executing the 4 bit decoding routine for all list entries of the posting list.

After the entire posting list has been decoded in step 108, in the next step 110 the execution of the first decoding procedure is evaluated in order to detect any potential failure of the decoding procedure. This is practically performed by comparing a size indicator of each list entry of the posting list with the selected type of decoding routine. Since in realistic situations, up to 95% of the list entries of a posting list correspond to the most frequent size of the posting list entries, a failure of the first decoding procedure is exceptional.

In step 112 the result of the evaluation of the first decoding procedure is analyzed. When in step 112 no failure of execution of the first decoding procedure has been detected, the method continues with step 114 where the decoded posting list is used in order to retrieve the corresponding text document identifiers to fulfill the search query. In the opposite case, when in step 112 a failure during execution of the first decoding procedure has been detected, the method continues with step 116.

In step 116, a second decoding procedure is selected that makes use of sequentially determining the size of each posting list entry before decoding an appropriate posting list entry. After the second decoding procedure has been selected in step 116 in the successive step 118 the posting list is decoded by executing the second decoding procedure. After this decoding step the method continues with step 120 that corresponds to step 114, where the text document identifiers associated to the posting list are retrieved.

Compared to a conventional implementation, the inventive method provides an appreciable improvement of the decoding performance when the first decoding procedure does not produce any failure upon execution. In the opposite case, when the first decoding procedure produces a failure and the second decoding procedure has to be applied, the entire decoding process slows down. The method principally makes use of the fact that a high percentage of posting list entries feature the bucket and therefore the benefits that are due to correct execution of the first decoding procedure are larger than the disadvantages arising from a failure of the first decoding procedure. Therefore, the inventive method advantageously exploits the fact that the frequency distribution of the lengths of the posting list entries is non-uniform and features a peak for a distinct bucket.

Figure 3:
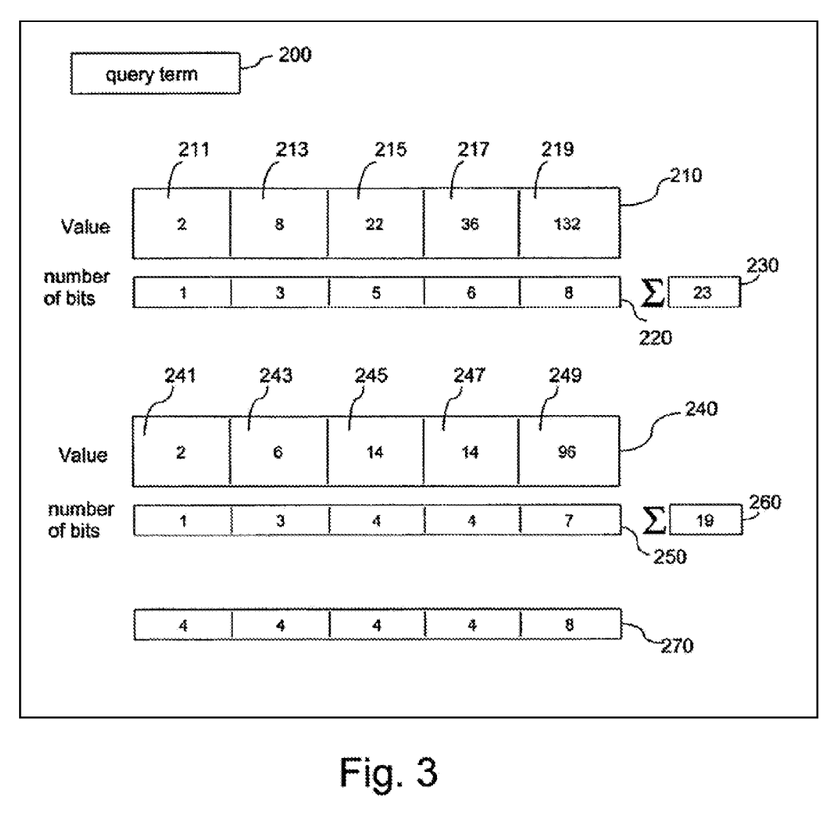
FIG. 3 illustrates an un-encoded and an encoded posting list.

FIG. 3 illustrates an un-encoded posting list 210 and a corresponding delta encoded posting list 240. In this illustrative example a particular query term 200 is contained in five different documents of the indexed collection of text documents. Therefore, the posting list 210 represents an array having five list entries 211, 213, 215, 217, 219. Each one of the list entries has a value specifying a document identifier. In this example, these five values are: 2, 8, 22, 36, 132. The bit number array 220 illustrates the number of bits that are needed in order to store each one of the values of the posting list 210.

The list entry 211 can be stored by a 2 bit number, list entry 213 can be stored by a 3 bit number, list entry 215 can be stored by a 5 bit number, list entry 217 can be stored by a 6 bit number and list entry 219 can be stored by an 8 bit number. Altogether, the posting list 210 needs a minimum storage capacity given by the total bits 230. In this case at least 23 bits are required in order to store the posting list.

The encoded posting list 240 corresponds to the un-encoded posting list 210 by making use of a delta encoding technique. In this case the single list entries 241, 243, 245, 247 and 249 are representative of the difference to the preceding list entry but not to the absolute number of the document identifier. For example, in order to obtain the document identifier specified by the list entry 215 of the un-encoded posting list 210, the corresponding list entry 245 of the encoded posting list 240 has to be added to all preceding posting list entries 243 and 241. As a consequence, the bit number array 250 corresponding to the encoded posting list 240 contains smaller values than the bit number array 220 that corresponds to the un-encoded posting list 210. Consequently, the number of total bits 260 reduces to 19 bits. Obviously, the minimum required storage capacity appreciably reduces.

The table 270 illustrates a segmented bit number array featuring different buckets. This is of practical relevance in order to limit the number of different buckets. In the example illustrated in FIG. 3, 4 bit and 8 bit buckets are applicable for storage of the single entries of the posting list 240. Hence, after delta encoding the list entries 241 through 247 are stored by means of 4 bit buckets and only the list entry 249 requires an 8 bit bucket.

Figure 4:
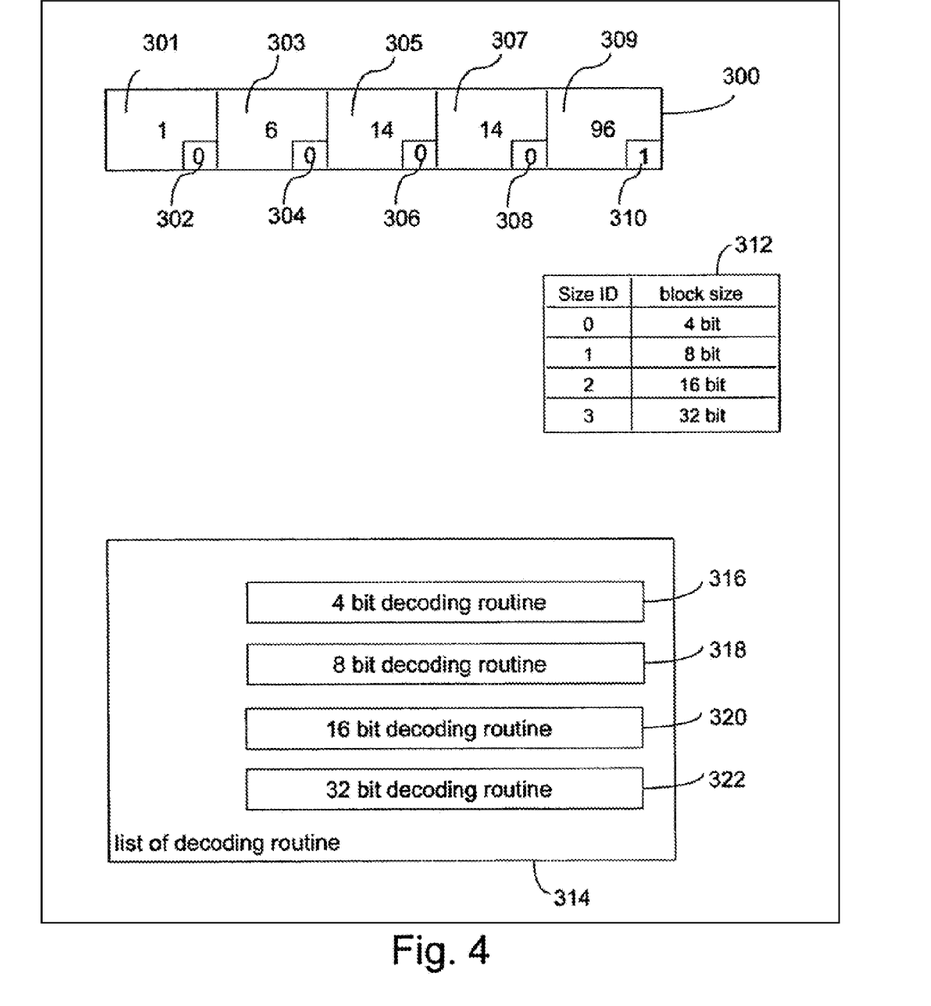
FIG. 4 illustrates an encoded posting list with size identifiers and a list of decoding procedures.

FIG. 4 depicts a posting list 300 corresponding to the encoded posting list 240. The posting list 300 has list entries 301, 303, 305, 307 and 309. Each list entry has a value and a size indicator. The list entry 301 has size indicator 302, the list entry 303 has size indicator 304, the list entry 305 has size indicator 306, the list entry 307 has size indicator 308 and the list entry 309 has size indicator 310.

In this example, the values of the list entries may either be stored as 4 bit, 8 bit, 16 bit or 32 bit numbers resulting in a variety of four different buckets for storing the list entries of the posting list 300. Since there are only four different types of storage buckets, the size indicator itself can be represented by a 2 bit number. Therefore, the assignment table 312 provides an assignment between a 2 bit size indicator and a corresponding bucket. For example size indicator zero corresponds to 4 bit, size indicator 1 corresponds to 8 bit, size indicator 2 corresponds to 16 bit and size indicator 3 corresponds to a 32 bit storage bucket.

Now, for each bucket there exists a corresponding decoding procedure. The list of decoding routines 314 provides different decoding routines 316, 318, 320 and 322 specified for a decoding of 4 bit, 8 bit, 16 bit or 32 bit list entries.

For decoding each of the list entries 301, 303, 305, 307, 309 of the posting list 300 the second decoding procedure makes use of the corresponding size indicators 302, 304, 306, 308, and 310 of each posting list entry. Before actually decoding a list entry 301, the second decoding procedure first determines the bucket of the list entry 301 by making use of the corresponding size indicator 302. Having correctly identified the size of the storage bucket of index entry 301, the second decoding procedure selects the appropriate decoding routine 316 in order to correctly decode the list entry 301.

In contrast to the second decoding procedure, the first decoding procedure effectively makes use of the frequency distribution of the sizes of the posting list entries respectively of the associated buckets. As a matter of fact, 80% of the entries of the posting list 300 are stored as 4 bit values. The first decoding procedure now effectively exploits this information and selects only once the appropriate 4 bit decoding routine 316 of the list of decoding routines 314 for decoding the entire posting list 300. In this example, the first four list entries 301, 303, 305, 307 are decoded correctly and only the last posting list entry 309 produces an error. Since the first decoding procedure is based on the most frequent bucket of the list entries of the posting list 300, a concrete determination of each posting list's bucket is skipped, thus leading to an appreciable performance enhancement.

In the illustrated example, only the last index entry 309 has been subject to failure and has to be repeatedly decoded by making use of the second decoding procedure. In general, the benefits or the performance enhancement that is due to application of the first decoding procedure is appreciably larger than the disadvantages arising from applying the second decoding procedure in those rare cases when the first decoding procedure has turned out to be erroneous.

When during execution of the first decoding procedure an error occurs, preferably only the particular list entry that has been erroneously decoded has to be decoded by the second decoding procedure. In this way it is effectively prevented that the complete posting list 300 is subject to the second decoding procedure.

Figure 5:
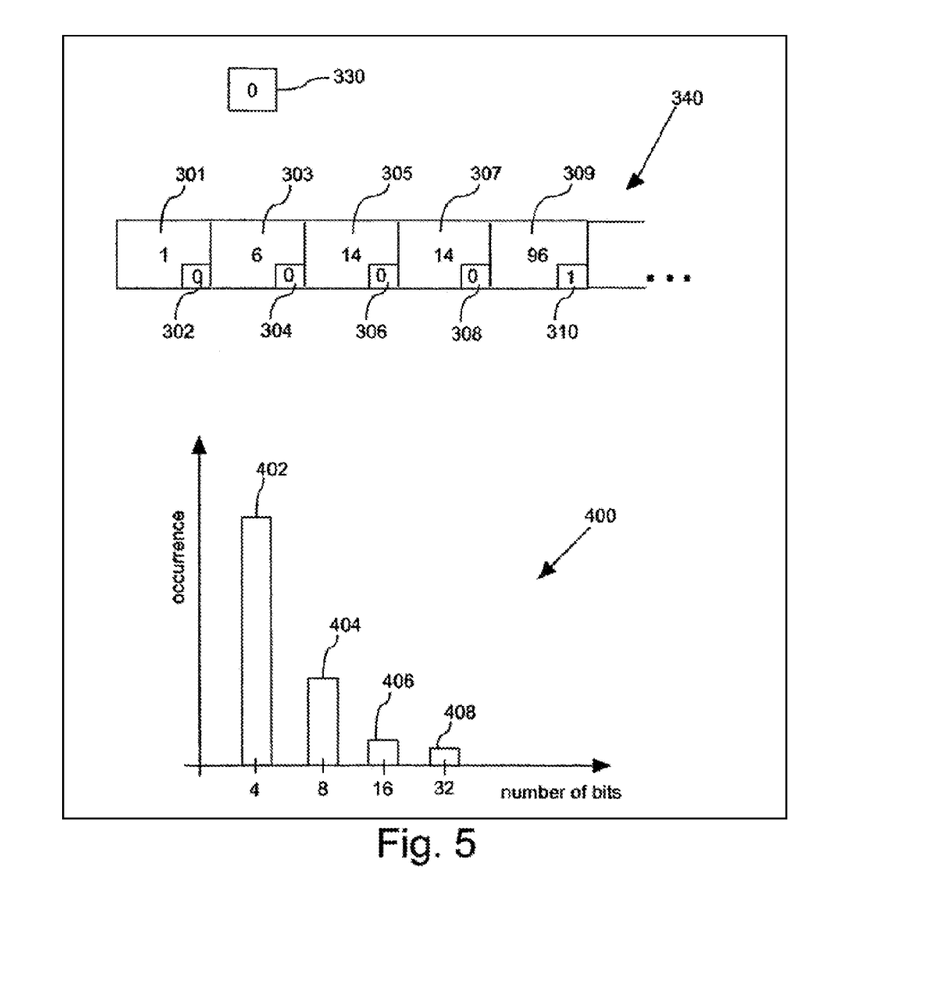
FIG. 5 depicts a posting list and a corresponding frequency distribution of the list entries.

FIG. 5 illustrates a posting list 340 with the same first five list entries 301, 303, 305, 307, 309. Also here, the size indicators 302, 304, 306, 308, 310 correspond to the ones in FIG. 4. Additionally to the posting list 300 of FIG. 4 the dictionary entry associated with the posting list of FIG. 5 has an indicator 330 representing the most frequent bucket of all posting list entries. In this case the peak bucket indicator 330 equals to zero, indicating that the most frequent bucket of the entire posting list is a 4 bit bucket. This indicator 330 is preferably attached to the appropriate dictionary entry. Alternatively, it may be stored with the posting list itself.

The statistical table 400 gives an example of a typical frequency distribution of the posting list entries 340. The four bars of the statistical table 400, 402, 404, 406, 408 represent the number of posting list entries in the 4 bit buckets, 8 bit buckets, 16 bit buckets and 32 bit buckets, respectively. As can be seen from the statistical table 400, the number of entries in the 4 bit buckets of the posting list 340 by far exceeds the number of entries in any other bucket. Such a non-uniform distribution of the posting list entries is typical for a majority of indexed collections of text documents in a real environment, such as e.g., the IBM intranet.

Preferably, the peak bucket indicator 330 is already determined upon creation of the posting list 340. In this way the peak bucket does not have to be determined when the posting list is subject to decoding, i.e., during the decoding procedure.

Figure 6:
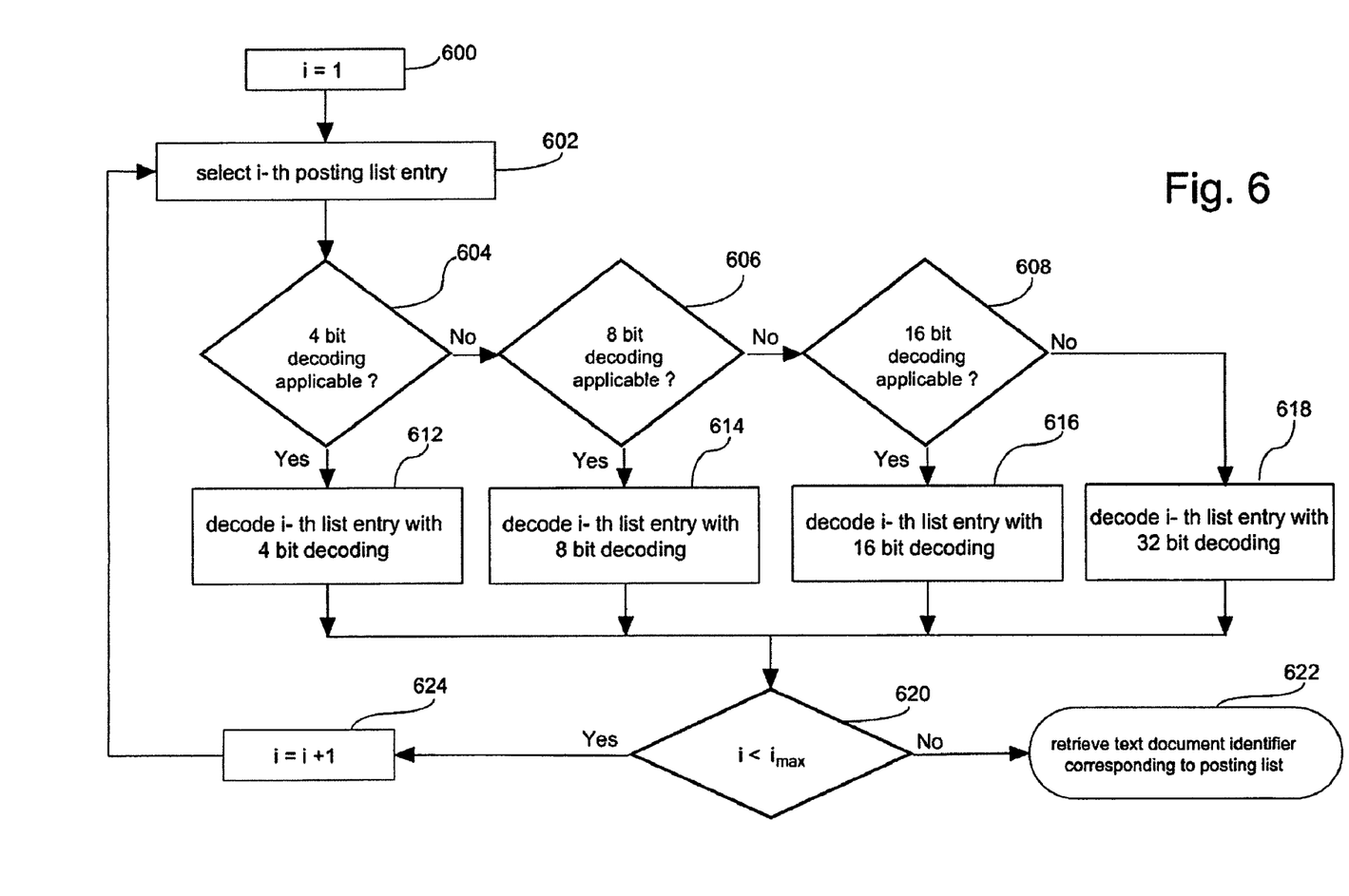
FIG. 6 illustrates a detailed flowchart of the second decoding procedure.

FIG. 6 depicts a flowchart of the second decoding procedure. In this example, a complete posting list is decoded by the second decoding procedure. Therefore, in the first step 600 a list entry counter i is set to 1 in order to specify the first list entry of the posting list. In the following step 602 the corresponding i-th posting list entry is selected that becomes subject to decoding.

In the following step 604 it is checked whether a 4 bit decoding is applicable to the selected posting list entry. If such a 4 bit decoding is applicable, the method continues with step 612, where the i-th index entry is decoded by making use of a 4 bit decoding routine. Thereafter, in step 620 it is checked if the counter i is smaller than $i_{max}$. If in step 620 i is smaller than $i_{max}$ then the procedure continues with step 624 incrementing the counter i by 1. The method then proceeds by returning to step 602, where the next posting list entry is selected.

The loop described by the steps 602, 604, 612, 620, 624 continues as long as the 4 bit decoding is applicable and as long as the procedure has reached the last list entry of the posting list. When in step 620 $i=i_{max}$, then the procedure continues with step 622 where the text documents corresponding to the decoded posting list are retrieved. As long as there are only 4 bit encoded storage buckets in the posting list, the above described loop is executed repeatedly.

Comparing this loop with the procedure illustrated in FIG. 2, it is obvious that the loop illustrated in FIG. 6 at least performs one additional step 604 of checking whether a 4 bit decoding is applicable to the selected posting list entry. Here, performing of a certain number of case statements is necessary. On average the number of case statement equals the number of buckets divided by two. Regarding this simple example, the first decoding procedure is clearly advantageous compared to the second decoding procedure because it skips at least one dispensable operation.

A different situation arises when in step 604, it is determined that a 4 bit decoding is not applicable. In this case the second method illustrated by FIG. 6 continues with step 606, where it is checked whether an 8 bit decoding is applicable. If an 8 bit decoding is applicable, the procedure continues with step 614, where the i-th index entry is decoded by making use of an 8 bit decoding routine. Thereafter, step 620 is applied.

When in step 606, it turns out that an 8 bit decoding is neither applicable, the procedure continues with step 608, where it is checked whether a 16 bit decoding routine is applicable to decode the i-th posting list entry. If a 16 bit decoding routine is applicable, the second decoding procedure continues with step 616, where the corresponding 16 bit decoding routine is applied to the i-th index entry. After this decoding step 616, the procedure again continues with step 620.

When in step 608 a 16 bit decoding routine is neither applicable, the method directly continues with the last available decoding routine, i.e., the 32 bit routine is applied to decode the i-th index entry in step 618. Also thereafter, the method continues with step 620.

When for example a statistical table 400 of a posting list has its peak at 8 or even 16 bit storage buckets, the first decoding procedure directly switches to a corresponding decoding routine, whereas the second decoding procedure additionally executes a number of steps in order to correctly decode posting list entries having 8 or even more bits. In contrast to the second decoding procedure, the first decoding procedure dynamically adapts to the frequency distribution of the posting list entries.

The procedure illustrated by the flow chart of FIG. 6 is in no case restricted to a sequential decoding of all list entries of a posting list. Moreover, the procedure is provided with means allowing to selectively decode various entries of the posting list.

When used in combination with the first decoding procedure for correcting failures of the execution of the first decoding procedure, the second decoding procedure can be invoked in such a way that only a particular posting list entry is decoded appropriately, by e.g., setting the counter in step 600 to the appropriate number.

Figure 7:
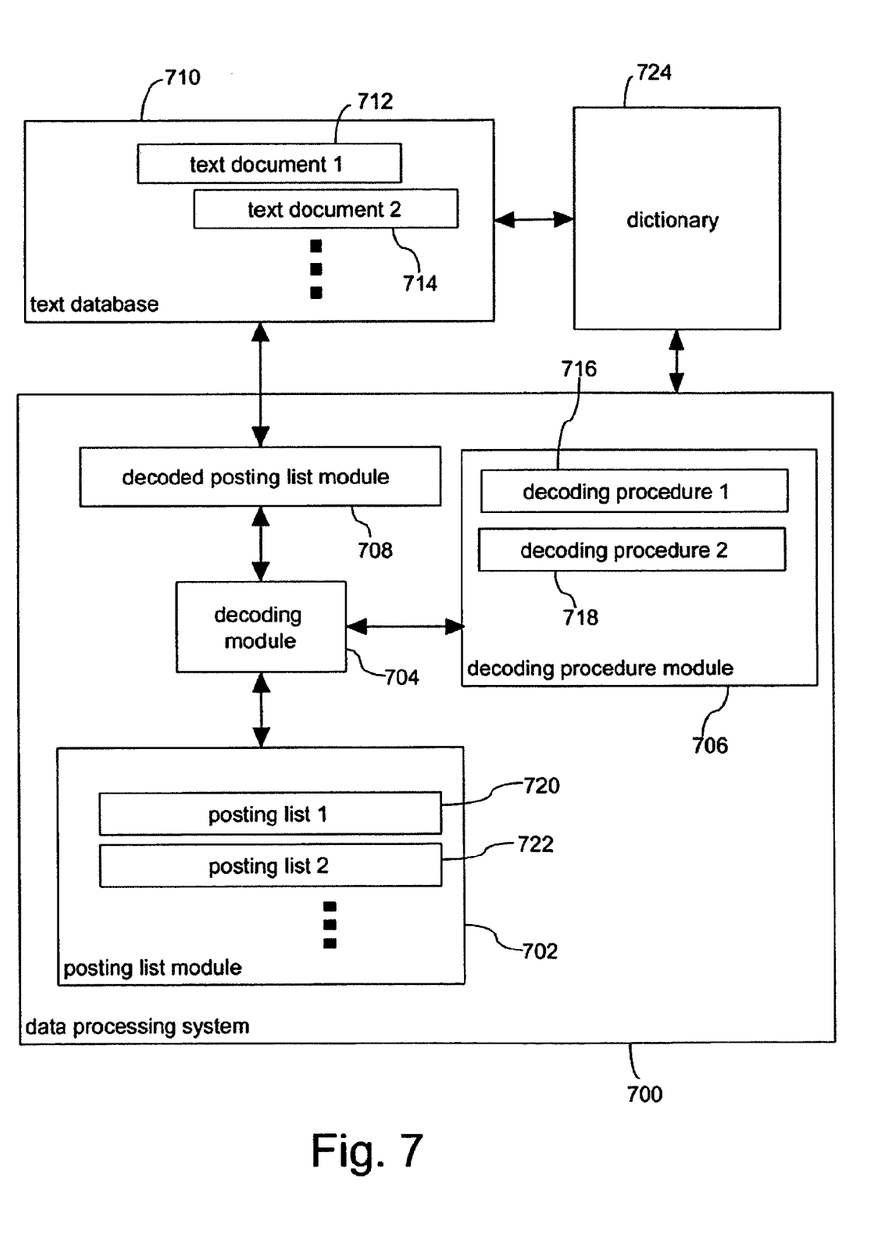
FIG. 7 illustrates an inventive data processing system.

FIG. 7 finally illustrates a block diagram of a corresponding data processing system 700. The data processing system has a posting list module 702 having at least a first and a second posting list 720, 722, respectively. The data processing system 700 further has a decoding module 704, a decoded posting list module 708 as well as a decoding procedure module 706 providing a first and a second decoding procedure 716, 718, respectively. Furthermore, the data processing system 700 has access to an external text database 710 providing a collection of text documents 712, 714. Furthermore, a dictionary 724 stores search terms occurring within the text document 712, 714.

When subject to encoding or to indexing the text documents 712, 714 of the text database 710 are processed by the data processing system 700. Consequently, the dictionary 724 is created or modified with respect to the text documents 712, 714. Alternatively, the processing system may make use of a pre-existing dictionary 724. Processing of the text documents 712, 714, and/or the dictionary 724 serves to provide a variety of posting lists 720, 722. The resulting posting lists 720, 722, assign a particular search term to a corresponding text document 712, 714. The posting lists 720, 722 are stored by the posting list module 702 in a compressed form. In order to resolve the document identifiers for each search term required for a retrieval of the text documents 712, 714, the decoding module 704 applies a decoding procedure on the basis of the posting lists 720, 722. The decoding module 704 makes use of one of the decoding procedures 716, 718 provided by the decoding procedure module 706.

In this example, the decoding procedure 716 corresponds to the first decoding procedure making use of the most frequent type of storage bucket of one or several posting lists 720, 722. Decoding procedure 718 corresponds to a second decoding procedure of the present invention making use of determining the type of storage bucket and subsequently decoding the corresponding list entry of a posting list 720, 722.

Once the decoding module 704 has successfully applied the first decoding procedure 716, or successfully applied a combination of first decoding procedure 716 and second decoding procedure 718 in case that the first decoding procedure has produced a failure, the decoded posting list is passed over by the decoding module 704 to the decoded posting list module 708. Since the decoded posting list is provided by the decoded posting list module 708, the data processing system 700 can now easily identify each list entry of each decoded posting list in order to retrieve the corresponding text documents 712, 714. of the text database 710.

Regarding the above illustrated examples, it should be clear that by applying the first decoding procedure, the number of total operations needed for decoding an entire posting list only decreases appreciably when the distribution of posting list entries is non-uniform. Even though a decoding failure occurs upon execution of the first decoding procedure it can be assumed that the operations skipped due to application of the first decoding procedure outnumbers the additional operations that have to be performed in those exceptional cases, when the result of the first decoding procedure is unsatisfactory.

What is claimed is:

1. A system for selecting a decoding procedure for decoding text document identifiers, comprising:
    a processor; and
    a memory device coupled to the processor, wherein the memory device stores an application which, when executed by the processor, causes the processor to:
        identify, via encoded text document identifiers, text documents in a posting list resulting from a search query, wherein the encoded text document identifiers include a peak bucket size;
        decode, via a first decoding procedure, an encoded text document identifier of the encoded text document identifiers, wherein the first decoding procedure is specific for the peak bucket size; and
        in response to a failure to decode the encoded text document identifier with the first decoding procedure, decode, via a second decoding procedure, the encoded text document identifier.

2. The system of claim 1, wherein the posting list has list entries and each list entry comprises a value and a size indicator;
    wherein the size indicator specifies the size of the list entry; and
    wherein the size of the list entry depends on the value of the list entry.

3. The system of claim 2, wherein the first decoding procedure is selected from a plurality of decoding procedures; and
    wherein each decoding routine of the plurality of decoding procedures is indicative of a size of the list entries of the posting list.

4. The system of claim 2, wherein the first size of the encoded list entries is stored as a size indicator of the posting list in form of an entry in a dictionary.

5. The system of claim 4, wherein any one or more of the posting list and the dictionary is dynamically modified, in response to any of the addition or removal of at least some of the text documents from the indexed collection of text documents.

6. The system of claim 1, further causing the processor to:
    determine whether the first decoding procedure has failed in accordance with a further bucket size.

7. The system of claim 1, further causing the processor to:
    execute a further decoding procedure for decoding an encoded list entry in response to a failure to decode an encoded list entry with the second decoding procedure.

* * * * *